US012725818B2

(12) United States Patent
Hamanoi et al.

(10) Patent No.: US 12,725,818 B2
(45) Date of Patent: Sep. 1, 2026

(54) FUEL CELL VEHICLE

(71) Applicant: TOYOTA JIDOSHA KABUSHIKI KAISHA, Toyota (JP)

(72) Inventors: Osamu Hamanoi, Toyota (JP); Masashi Nakamura, Nagoya (JP); Naoki Tomi, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 530 days.

(21) Appl. No.: 18/481,625

(22) Filed: Oct. 5, 2023

(65) Prior Publication Data

US 2024/0136554 A1 Apr. 25, 2024
US 2024/0234766 A9 Jul. 11, 2024

(30) Foreign Application Priority Data

Oct. 19, 2022 (JP) ................................ 2022-167489

(51) Int. Cl.

*H01M 8/04746* (2016.01)
*B60L 50/70* (2019.01)
*F04D 17/10* (2006.01)
*H01M 8/04111* (2016.01)
*H01M 8/04313* (2016.01)

(52) U.S. Cl.

CPC ......... *H01M 8/04753* (2013.01); *B60L 50/70* (2019.02); *F04D 17/10* (2013.01); *H01M 8/04111* (2013.01); *H01M 8/04313* (2013.01); *H01M 2250/20* (2013.01)

(58) Field of Classification Search

CPC .......... B60L 50/70; B60L 58/30; F04D 17/10; H01M 8/04753; H01M 8/04111; H01M 8/04313; H01M 8/04; H01M 8/04298; H01M 2250/20

See application file for complete search history.

(56) References Cited

U.S. PATENT DOCUMENTS

2010/0047646 A1* 2/2010 Kitamura .......... H01M 8/04753 429/429
2010/0291452 A1* 11/2010 Imanishi ............. H01M 8/0488 429/432

(Continued)

FOREIGN PATENT DOCUMENTS

JP 2017126540 A 7/2017
JP 2018113168 A 7/2018

(Continued)

*Primary Examiner* — Lori Wu

(74) *Attorney, Agent, or Firm* — Hunton Andrews Kurth LLP

(57) ABSTRACT

A fuel cell vehicle may include: a fuel cell stack configured to generate electric power for a traction motor; a compressor configured to supply air to the fuel cell stack, the compressor including an impeller and a motor configured to rotate the impeller; and a controller configured to decrease a rotation speed of the motor when detecting accelerator-off. The controller may be configured to decrease the rotation speed at a first deceleration rate when an air outlet pressure of the compressor is higher than a pressure threshold, and decrease the rotation speed at a second deceleration rate when the air outlet pressure of the compressor is lower than the pressure threshold, the second deceleration rate being lower than the first deceleration rate.

4 Claims, 4 Drawing Sheets

(56) References Cited

U.S. PATENT DOCUMENTS

| | | | | |
|---|---|---|---|---|
| 2016/0111736 | A1* | 4/2016 | Matsubara | H01M 8/04492 429/414 |
| 2016/0149242 | A1* | 5/2016 | Asai | H01M 8/04104 429/446 |
| 2020/0361470 | A1* | 11/2020 | Yonezawa | B60W 10/08 |

FOREIGN PATENT DOCUMENTS

| | | | |
|---|---|---|---|
| JP | 2018113169 | A | 7/2018 |
| JP | 2018113170 | A | 7/2018 |
| JP | 2022120320 | A | 8/2022 |

* cited by examiner (1)
Accelerator Position (%)
Accelerator-off
Time
0
(2)
First Deceleration Rate
Rotation Speed (rpm)
Second Deceleration Rate
0
T3
(3)
Air Discharge Amount (L/min)
0
(4)
Air Outlet Pressure
Pressure Threshold
Atmospheric Pressure
T4
(5)
Internal Pressure in Housing
Atmospheric Pressure
(6)
B
Second Limiting Point
Internal Pressure Difference
0
First Limiting Point
A
T1 T2
T5

FUEL CELL VEHICLE

REFERENCE TO RELATED APPLICATIONS

This application claims priority from Japanese Patent Application No. 2022-167489 filed on Oct. 19, 2022. The entire contents of the priority application are incorporated herein by reference.

BACKGROUND ART

The technology disclosed herein relates to a fuel cell vehicle.

A fuel cell system includes a fuel cell stack and a compressor that supplies air to the fuel cell stack. The compressor rotates an impeller by a motor to compress the air. A compression chamber (an impeller chamber) of the compressor and a motor housing are isolated from each other by a mechanical seal, however, if an internal pressure difference between the compression chamber and the motor housing is large, air or lubrication oil may leak through the mechanical seal. A fuel cell system disclosed in Japanese Patent Application Publication No. 2018-113169 includes a pressure release valve to release an internal pressure of a motor housing. The fuel cell system disclosed in Japanese Patent Application Publication No. 2022-120320 includes a release pipe to release a pressure inside a motor housing. A filter is attached to the release pipe. If the filter is clogged, air may not be discharged from the motor housing. Japanese Patent Application Publication No. 2022-120320 discloses a technology for predicting a period of replacing the filter. Japanese Patent Application Publications No. 2018-113169 and No. 2022-120320 disclose a vehicle including a fuel cell system (fuel cell vehicle).

DESCRIPTION

A fuel cell vehicle drives a traction motor with electric power generated by a fuel cell stack. A target output of the traction motor, i.e., a target output of the fuel cell stack, changes frequently depending on driver's accelerator work. A flow rate of air supplied to the fuel cell stack also depends on the accelerator work. In other words, a rotation speed of the motor of a compressor also depends on the accelerator work. A sudden change in the accelerator work also suddenly changes the rotation speed of the motor of the compressor. The sudden change in the rotation speed of the motor increases an internal pressure difference between a compression chamber (impeller chamber) of the compressor and a motor housing (especially when the aforementioned pressure release valve or the release pipe do not function). If a pressure within the motor housing becomes prominently lower than a pressure in the compression chamber, air in the compression chamber may leak into the motor housing. Conversely, if the pressure in the motor housing becomes prominently higher than the pressure in the compression chamber, lubrication oil in the motor housing may leak into the compression chamber. If the lubrication oil which has leaked into the compression chamber enters the fuel cell stack, the fuel cell stack may be damaged.

When a driver releases an accelerator pedal (which will be referred to as "accelerator-off"), the target output abruptly decreases, by which a controller abruptly decreases the rotation speed of the motor. At this time, the internal pressure difference between the compression chamber (impeller chamber) of the compressor and the motor housing may become large. If the rotation speed of the motor of the compressor is reduced gradually at the time of accelerator-off, increase in the internal pressure difference can be suppressed. However, if the rotation speed of the motor of the compressor is reduced gradually in spite of the accelerator-off, this makes the driver feel uncomfortable, or this makes the driver feel something is wrong with the vehicle. This is because the driver expects noise of the vehicle to be reduced at the time of the accelerator-off, but if the rotation speed of the motor is not reduced quickly, the noise and vibration are transmitted to the driver. This disclosure provides a technique to suppress increase in an internal pressure difference at the time of accelerator-off without making a driver feel uncomfortable and without using the aforementioned pressure release valve or release pipe.

A fuel cell vehicle disclosed herein may comprise a fuel cell stack, a compressor, and a controller. The fuel cell stack may be configured to generate electric power for a traction motor. The compressor may be configured to supply air to the fuel cell stack. The compressor may include an impeller and a motor configured to rotate the impeller. The controller may be configured to decrease a rotation speed of the motor when detecting accelerator-off. The controller may be configured to decrease the rotation speed of the motor at a first deceleration rate when an air outlet pressure of the compressor is higher than a pressure threshold, and decrease the rotation speed of the motor at a second deceleration rate when the air output pressure is lower than the pressure threshold. The second deceleration rate may be lower than the first deceleration rate. The lower the "deceleration rate" is, the more slowly the rotation speed decreases.

The controller quickly decreases the rotation speed of the motor (at the first deceleration rate) while the air outlet pressure is high. Therefore, the fuel cell vehicle does not make the driver feel uncomfortable immediately after the accelerator-off. The controller decreases the rotation speed of the motor gradually (at the second deceleration rate) after the air outlet pressure has decreased to the pressure threshold. Hence, the pressure in the motor housing decreases gradually, and the pressure difference between the compression chamber and the motor housing does not increase rapidly. The fuel cell vehicle disclosed herein can suppress increase in the internal pressure difference (internal pressure difference between the compression chamber and the motor housing) at the time of the accelerator-off without making the driver feel uncomfortable.

Details of the technology disclosed herein and further improvements are described in the following EMBODIMENTS.

EMBODIMENTS

Some features of the technology disclosed herein are listed below.

The controller is configured to decrease the rotation speed of the motor at the second deceleration rate when the air outlet pressure is lower than the pressure threshold in a state where a temperature of lubrication oil in the compressor is lower than a predetermined temperature threshold. On the other hand, the controller may be configured to decrease the rotation speed of the motor at the first deceleration rate even when the air outlet pressure of the compressor is lower than the pressure threshold in the state where the temperature of the lubrication oil in the compressor is higher than the predetermined temperature threshold. The lubrication oil with a higher temperature has a lower viscosity. The lubrication oil with the lower viscosity generates bubbles more easily. The generated air bubbles escape through a release pipe which relieves a pressure inside the motor housing. Therefore, the internal pressure in the motor housing tends not to increase. When the temperature of the lubrication oil is high and the internal pressure of the motor housing tends not to increase, the rotation speed of the motor is decreased at the first deceleration rate, which can make the driver feel less uncomfortable.

The pressure threshold may depend on the rotation speed of the motor of the compressor. If the pressure loss in an air flow path between the compressor and the fuel cell stack is high, the air outlet pressure will be high even when the rotation speed of the motor is low. On the other hand, if the pressure loss in the air flow path is small, the air outlet pressure tend not to be high even when the rotation speed of the motor is high. A relationship between the air outlet pressure and the rotation speed changes depending on a pressure resistance of the air flow path. Therefore, by changing the pressure threshold depending on the rotation speed of the motor, an appropriate pressure threshold can be set.

The first deceleration rate may be set to a maximum deceleration rate. By quickly decreasing the rotation speed of the motor until the air outlet pressure reaches the pressure threshold, the fuel cell vehicle does not make the driver feel uncomfortable at the time of the accelerator-off.

Figure 1:
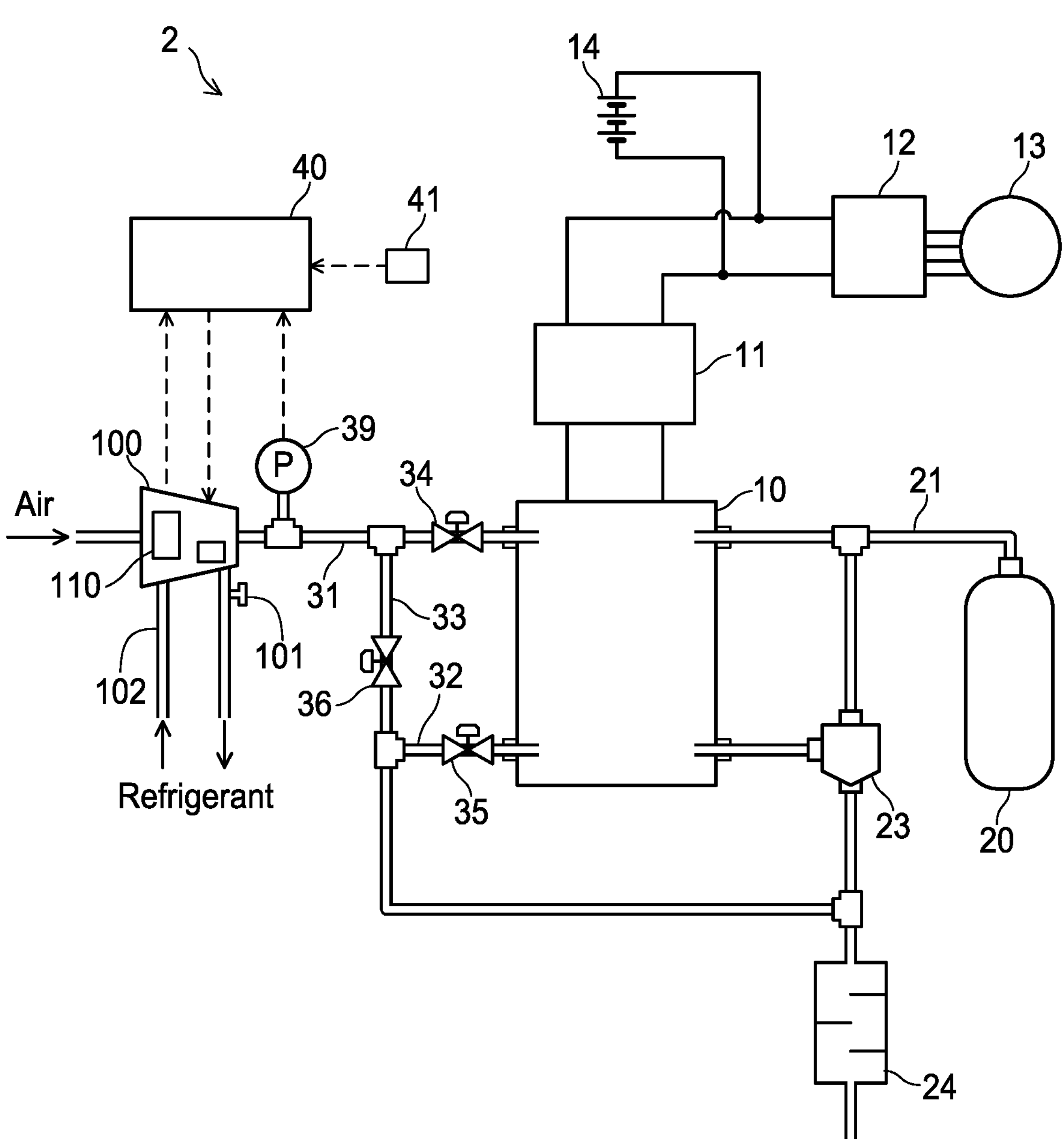
FIG. 1 is a block diagram of a power system of a fuel cell vehicle.

A fuel cell vehicle 2 of an embodiment will be described with reference to drawings. FIG. 1 shows a block diagram of a power system of the fuel cell vehicle 2. Hereafter, for simplicity of explanation, "fuel cell" may be referred to as "FC". The "fuel cell vehicle" and "fuel cell stack" will be referred to as "FC vehicle" and "FC stack", respectively.

The FC vehicle 2 drives a traction motor 13 with electric power generated by an FC stack 10. Output power of the FC stack 10 is boosted by a boost converter 11 and then supplied to an inverter 12. The inverter 12 converts the boosted DC power into AC power suitable for driving the traction motor 13.

A battery 14 is also connected to a DC terminal of the inverter 12. The battery 14 supplements the output power of the FC stack 10. The battery 14 is charged by surplus power of the FC stack 10.

As is well known, the FC stack 10 is configured to generate electric power by reaction of hydrogen (fuel) and oxygen (air). Hydrogen gas is supplied to the FC stack 10 from a hydrogen tank 20 through a fuel pipe 21. The hydrogen gas left after the reaction in the FC stack 10 is separated in a gas-liquid separator 23 and returned to the fuel pipe 21. Water and an exhaust gas separated in the gas-liquid separator 23 are discharged outside the vehicle through a muffler 24. Although the fuel pipe 21 includes several pressure sensors, various valves, and injectors, the illustrations thereof are omitted in the drawings.

The FC vehicle 2 takes in air from outside the vehicle and supplies the air (oxygen) to the FC stack 10. A compressor 100 is configured to compresses the outside air and supply it to the FC stack 10. The compressor 100 includes a motor 110 (an electric motor 110). The compressor 100 also includes a refrigerant pipe 102 passing therethrough. Refrigerant passing through the refrigerant pipe 102 cools lubrication oil in the compressor 100. The refrigerant pipe 102 includes a temperature sensor 101. The temperature sensor 101 is configured to measure a temperature of the refrigerant which has passed through the compressor 100. A measured value of the temperature sensor 101 is used as a temperature of the lubrication oil (an approximation of the temperature of the lubrication oil). The structure of the compressor 100 will be described in detail later with reference to FIG. 2.

An air pipe 31 is connected to an outlet of the compressor 100, and the air pipe 31 includes a pressure sensor 39. The pressure sensor 39 is configured to measure an air outlet pressure of the compressor 100 (pressure of compressed air). The outlet of the compressor 100 is connected to the FC stack 10 via the air pipe 31. The air is supplied from the compressor 100 to the FC stack 10 via the air pipe 31. The air pipe 31 includes a stop valve 34. The stop valve 34 will be closed when the FC stack 10 is stopped.

An air pipe 32 is connected to an air outlet of the FC stack 10. The air pipe 32 includes a pressure regulator valve 35. A bypass pipe 33 is connected to the air pipe 31, and the bypass pipe 33 is connected to the air pipe 32. The bypass pipe 33 includes a flow dividing valve 36. When the flow dividing valve 36 is opened, a portion of the air discharged from the compressor 100 bypasses the FC stack 10 and flows directly to the muffler 24.

The pressure regulator valve 35 and the flow dividing valve 36 are configured to regulate the flow of the air supplied to the FC stack 10. When a target output of the FC stack 10 (i.e., a target output of the traction motor 13) is high, the controller 40 increases an output of the compressor 100 and increases an air pressure in the FC stack 10 by throttling the pressure regulator valve 35. When the air pressure in the FC stack 10 increases, reaction efficiency in the FC stack increases. In other words, the output of the FC stack 10 increases.

When the target output of the FC stack 10 (i.e., the target output of the traction motor 13) is low, the controller 40 decreases the output of compressor 100 and opens the flow dividing valve 36 to decrease an amount of air supplied to the FC stack 10.

By regulating the pressure regulator valve 35 and the flow dividing valve 36, the internal pressure of the FC 10, i.e., the air outlet pressure of the compressor 100 changes.

Dotted arrow lines in FIG. 1 represent signal lines, and a measured value of an accelerator pedal sensor 41 (i.e. accelerator pedal position) is sent to the controller 40. The controller 40 determines the target output of the traction motor 13 (the target output of the FC stack 10) from the accelerator pedal position and a vehicle speed, and controls the FC stack 10, the boost converter 11, the inverter 12 and the compressor 100 so that the target output is achieved.

Measured values by the pressure sensor 39 and the temperature sensor 101 are also sent to the controller 40. The controller 40 also controls the compressor 100 based also on the measured values by the pressure sensor 39 and the temperature sensor 101. In particular, the controller 40 controls the motor 110 of the compressor 100 to suppress the compressed air from being suctioned into the motor housing of the compressor 100 when accelerator-off is detected. The "accelerator-off" means a driver releasing the accelerator pedal.

Figure 2:
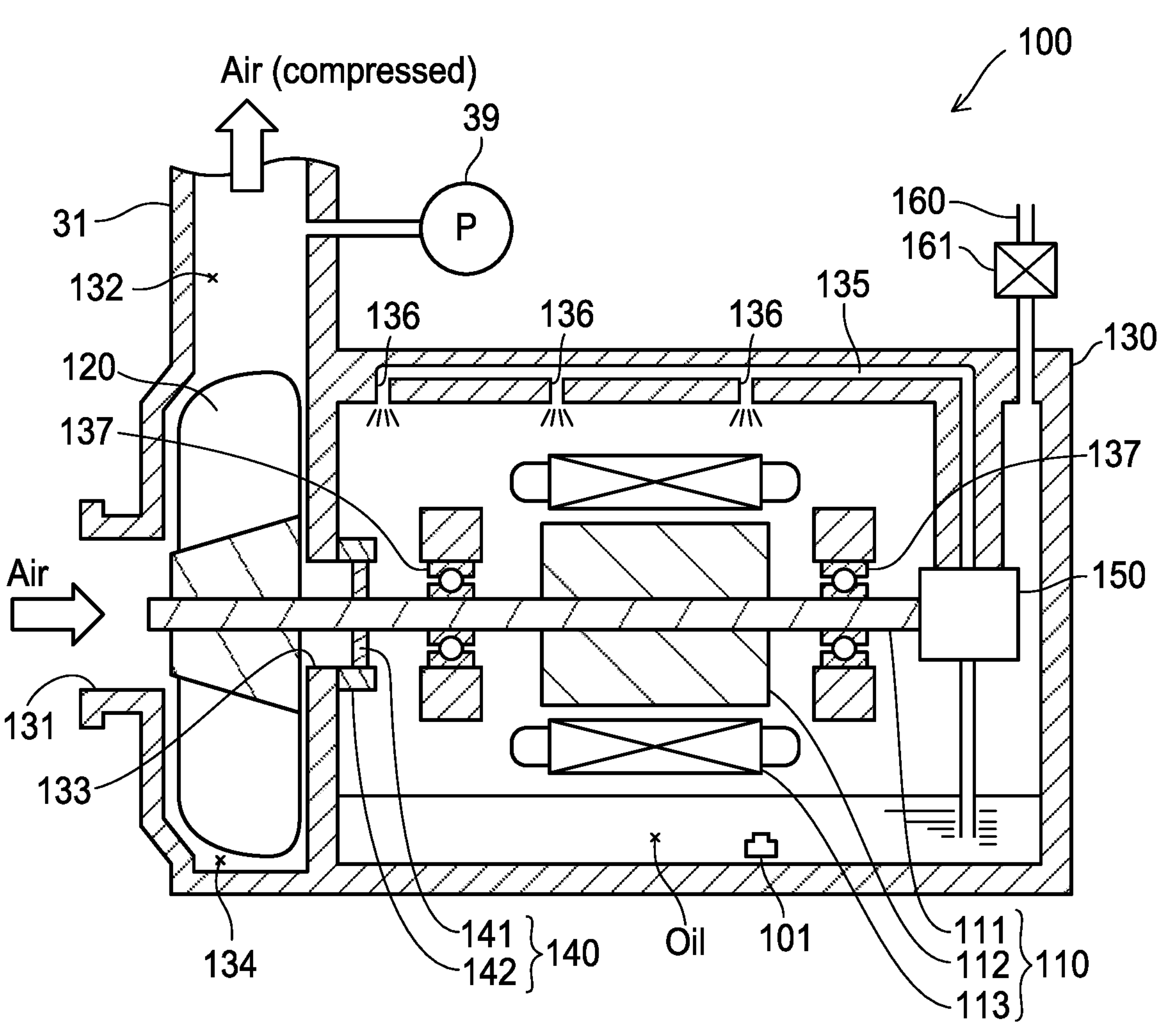
FIG. 2 is a cross-sectional view of a compressor.

FIG. 2 shows a cross-sectional view of the compressor 100. The compressor 100 is configured to compress air by rotating an impeller 120 using the motor 110 (the electric motor 110). The air which has entered from an inlet 131 of the compressor 100 is compressed by the rotating impeller 120 and discharged from an outlet 132 of the compressor 100 (an outlet of the compressed air). The compressed air is supplied to the FC stack 10 through the air pipe 31.

The motor 110 is constituted of a shaft 111, a rotor core 112, and a stator 113. The motor 110 is housed in a motor housing 130. The stator 113 is fixed inside the motor housing 130. The rotor core 112 is fixed to the shaft 111. The shaft 111 is rotatably supported by the motor housing 130 via bearings 137.

An oil pump 150 is mounted at the rear end of the shaft 111. The oil pump 150 pumps up the lubrication oil accumulating at the bottom of the motor housing 130 and supplies it to an oil channel 135. The oil channel 135 includes several nozzles 136. The nozzles 136 are located above the motor 110. The lubrication oil pumped by the oil pump 150 is sprayed onto the motor 110 to cool the motor 110.

The oil pump 150 rotates in synchronization with the shaft 111. In other words, when the rotation speed of the motor 110 increases, an amount of oil pumped out from the oil pump 150 also increases. When the motor 110 stops, the oil pump 150 also stops.

Another type of motor 110 is configured to supply the lubrication oil into the shaft 111 to cool the rotor core 112.

The shaft 111 extends through a through hole 133 in the motor housing 130 into a compression chamber 134. Within the compression chamber 134, the impeller 120 is fixed to the end of the shaft 111. A space between the shaft 111 and the through hole 133 is sealed by a mechanical seal 140. The mechanical seal 140 includes a stationary ring 142 and a rotating ring 141. The stationary ring 142 is attached to the inner circumferential surface of the through hole 133 and the rotating ring 141 is attached to the shaft 111. The rotating ring 141 is a rubber disk and rotates with the shaft 111 with the outer circumferential edge of the rotating ring 141 being in contact with the inner circumferential surface of the stationary ring 142. The mechanical seal 140 seals between the shaft 111 and the through hole 133 while allowing the shaft 111 to rotate.

The mechanical seal 140 isolates the compression chamber 134 and the internal space of the motor housing 130 from each other. However, an internal pressure difference between the compression chamber 134 and the motor housing 130 can deform the rotating ring 141 and cause a gap between the rotating ring 141 and the stationary ring 142. The internal pressure difference (the internal pressure difference between the compression chamber 134 and the motor housing 130) may cause air in the compression chamber 134 to leak into the motor housing 130 through the mechanical seal 140. Further, if the internal pressure of the motor housing 130 exceeds the internal pressure of the compression chamber 134, the lubrication oil may leak from the motor housing 130 into the compression chamber 134 through the mechanical seal 140. For simplicity of explanation, the "internal pressure difference between the compression chamber 134 and the motor housing 130" may hereinafter be referred to simply as the "internal pressure difference".

A group of gears may be provided between the shaft 111 and the impeller 120. The lubrication oil needs to be provided to the group of gears as well, thus the group of gears is also accommodated in the motor housing 130. When the group of gears is provided as well, the mechanical seal 140 isolates the compression chamber 134 from the interior space of the motor housing 130. When the group of gears is arranged next to the mechanical seal 140, the lubrication oil sprayed onto the gears also adheres to the mechanical seal 140. Especially in this case, the lubrication oil tends to leak into the compression chamber 134 when the internal pressure of the motor housing 130 is high.

The motor housing 130 includes a breather pipe 160. The breather pipe 160 connects the inside and outside of the motor housing 130. When the internal pressure of the motor housing 130 becomes excessively high, air is released from the breather pipe 160. The breather pipe 160 includes a filter 161 that prevents foreign matter (dusts) from entering the motor housing 130.

Since the air can enter and exit through the breather pipe 160, the internal pressure of the motor housing 130 may be maintained close to the atmospheric pressure. However, the internal pressure difference may increase due to clogging of the filter 161 or sudden change in the internal pressure of the motor housing 130.

Since the rotating ring 141 slides with respect to the stationary ring 142 of the aforementioned mechanical seal 140, the air and/or the lubrication oil may move between the compression chamber 134 and the motor housing 130. When the rotation speed of the motor 110 is constant, the internal pressure of the compression chamber 134 and the internal pressure of the motor housing 130 is balanced, and little air and/or lubrication oil moves between the compression chamber 134 and the motor housing 130. When a change in the rotation speed of the motor 110 is gradual, the internal pressure difference changes gradually, and little air and/or the lubrication oil passes through the mechanical seal 140.

When the rotation speed of the motor 110 rapidly decreases and the internal pressure of the motor housing 130 becomes excessively lower than the internal pressure of the compression chamber 134, the compressed air leaks from the compression chamber 134 to the motor housing 130 through the mechanical seal 140. When the internal pressure of the motor housing 130 then becomes higher than the internal pressure of the compression chamber 134 for some reason, the lubrication oil may leak from the motor housing 130 into the compression chamber 134 through the mechanical seal 140 with the air. The lubrication oil that has entered the compression chamber 134 enters the FC stack 10 with the compressed air. The lubrication oil may damage the FC stack 10. The typical cases in which the internal pressure of the motor housing 130 exceeds the internal pressure of the compression chamber 134 are: when the rotation speed of the motor 110 rapidly increases; and the latter part of an accelerator-off period. The change in internal pressure difference at the time of the accelerator-off will be explained later.

As mentioned earlier, when the rotation speed of the motor 110 changes gradually, the internal pressure difference between the compression chamber 134 and the motor housing 130 does not increase. The internal pressure difference increases when the rotation speed of the motor 110 changes rapidly. Conventionally, when the accelerator-off is detected, the controller 40 stops the motor 110 of the compressor 100 to stop the output of FC stack 10. The internal pressure of the motor housing 130 decreases sharply because the oil pump 150 stops. When the motor 110 is stopped, the oil pump 150 stops and the internal pressure of the motor housing 130 rapidly decreases. On the other hand, the compression chamber 134 is connected to the FC stack 10 via the air pipe 31, and the internal pressure of the compression chamber 134 does not decrease abruptly. When the motor 110 is stopped abruptly, the internal pressure of the motor housing 130 becomes significantly lower than the internal pressure of the compression chamber 134 and the compressed air enters the motor housing 130 from the compression chamber 134 through the mechanical seal 140.

When the breather pipe 160 is clogged, the internal pressure of the motor housing 130 is maintained above the atmospheric pressure. During the latter part of the accelerator-off period, the internal pressure of the compression chamber 134 decreases to the atmospheric pressure. The internal pressure of the motor housing 130 then becomes higher than the internal pressure of the compression chamber 134, and the lubrication oil may leak with the air from the motor housing 130 into the compression chamber 134 through the mechanical seal 140.

One way to reduce the increase in the internal pressure difference (the internal pressure difference between the compression chamber 134 and the motor housing 130) at the time of the accelerator-off is to gradually decrease the rotation speed of the motor 110 at the time of the accelerator-off. However, the driver who performed the accelerator-off expects the motors (the traction motor 13 and the motor 110 of the compressor 100) to be quiet quickly. However, when the rotation speed of the motor 110 does not decrease quickly at the time of the accelerator-off, vibration and noise are transmitted to the driver, which may be uncomfortable to the driver. In other words, the driving comfort of the FC vehicle 2 decreases. The FC vehicle 2 in the embodiment can suppress the increase in the internal pressure difference at the time of the accelerator-off while minimizing the uncomfortableness the driver feels.

A gradual decrease in the rotation speed of the motor 110 causes vibration and noise when the internal pressure of the air pipe 31, i.e., the air outlet pressure of the compressor 100, is high. On the other hand, there is time lag between when the rotation speed of the motor 110 is quickly decreased and when the internal pressure difference begins to increase. Therefore, the controller 40, which detects the accelerator-off, decreases the rotation speed at a first deceleration rate when the air outlet pressure of the compressor 100 is higher than a pressure threshold. The controller decreases the rotation speed at a second deceleration rate, which is lower than the first deceleration rate, when the air outlet pressure is lower than the pressure threshold. The higher the deceleration rate is, the more quickly the rotation speed decreases. By quickly decreasing the rotation speed while the air outlet pressure is high, noise and vibration can be suppressed. After the air outlet pressure becomes low, the rotation speed is decreased gradually, by which air leakage from the compression chamber 134 to the motor housing 130 (i.e., increase in the internal pressure difference) can be suppressed.

The controller 40 uses the measured value of the pressure sensor 39 and the temperature sensor 101 to reduce the increase in the internal pressure difference at the time of the accelerator-off. As mentioned earlier, the air pipe 31 is connected to the outlet of the compression chamber 134, and the air pipe 31 includes the pressure sensor 39. The pressure sensor 39 measures the air pressure (air outlet pressure) at the outlet 132 of the compressor 100. As mentioned earlier, the compressor 100 includes the refrigerant pipe 102 passing therethrough, and the temperature sensor 101 is provided at the refrigerant pipe 102. The temperature sensor 101 measures the temperature of the refrigerant that cools the lubrication oil. However, the measured value of the temperature sensor 101 is used as the temperature of the lubrication oil (an approximation of the temperature of the lubrication oil). In FIG. 2, the temperature sensor 101 is depicted in the lubrication oil that accumulates at the bottom of the motor housing 130 to show that the measured value of the temperature sensor 101 corresponds to the temperature of the lubrication oil.

Figure 3:
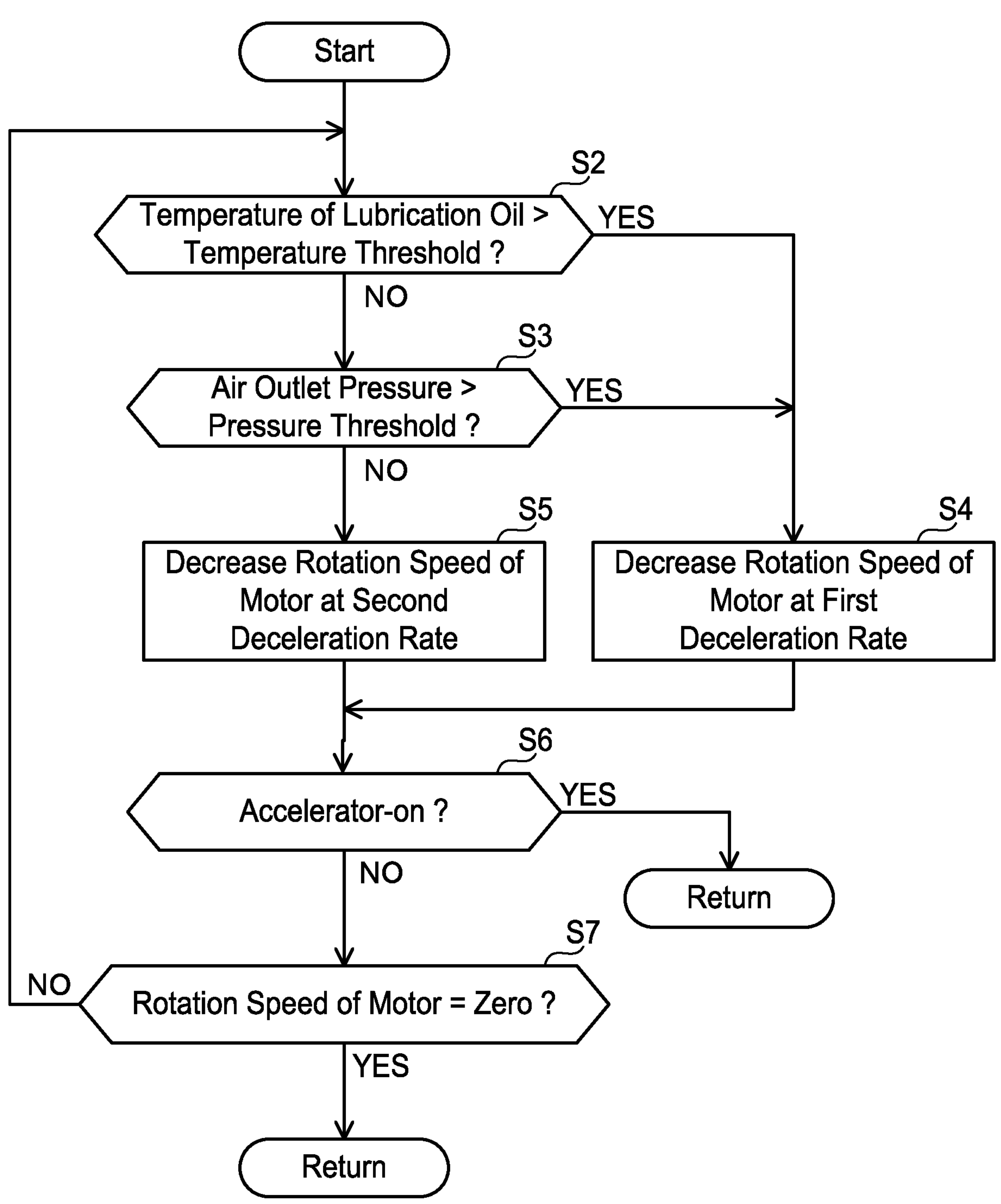
FIG. 3 is a flowchart of motor rotation speed control at the time of accelerator-off.

FIG. 3 shows a flowchart of motor rotation speed control executed by the controller 40 which has detected the accelerator-off. The process in FIG. 3 starts when the controller 40 detects the accelerator-off. The controller 40 detects the accelerator-off from the measured value of the accelerator pedal sensor 41.

The controller 40 decreases the rotation speed of the motor 110 at the first deceleration rate when the temperature of the lubrication oil is higher than a temperature threshold (step S2: YES, S4). The first deceleration rate corresponds to the maximum deceleration rate of the motor 110.

When the temperature of the lubrication oil is high, the viscosity of the lubrication oil decreases, and the lubrication oil easily generates air bubbles. The generated bubbles move through a release pipe which relieves pressure. Therefore, when the temperature of the lubrication oil is high, the internal pressure of the motor housing 130 tends not to increase. In such a case, the controller 40 decreases the rotation speed at the first deceleration rate regardless of the value of the air outlet pressure.

When the temperature of the lubrication oil is lower than the temperature threshold and the air outlet pressure is higher than the predetermined pressure threshold, the controller 40 decreases the rotation speed at the first deceleration rate (steps S2: NO, S3: YES, S4). On the other hand, the controller 40 decreases the rotation speed at the second deceleration rate when the temperature of the lubrication oil is lower than the temperature threshold and the air outlet pressure is lower than the predetermined pressure threshold (steps S2: NO, S3: NO, S5). The second deceleration rate is set lower than the first deceleration rate. As mentioned earlier, while the air outlet pressure is high, the controller 40 quickly decreases the rotation speed at the first deceleration rate, by which vibration or noise tends not to occur, by which the driver does not feel uncomfortable. When the air outlet pressure becomes low, the controller 40 gradually decreases the rotation speed at the second deceleration rate. By doing so, the increase in the internal pressure difference between the compression chamber 134 and the motor housing 130 can be prevented.

Step S2 should be employed, but may be omitted.

The controller 40 continues to decrease the rotation speed until the accelerator is pressed again (step S6: YES) or until the rotation speed of the motor 110 reaches zero (step S7: YES). After the accelerator pedal is pressed again, the controller 40 controls the rotation speed of the motor 110 of the compressor 100 according to the target output of traction motor 13 (target output of the FC stack 10).

Figure 4:
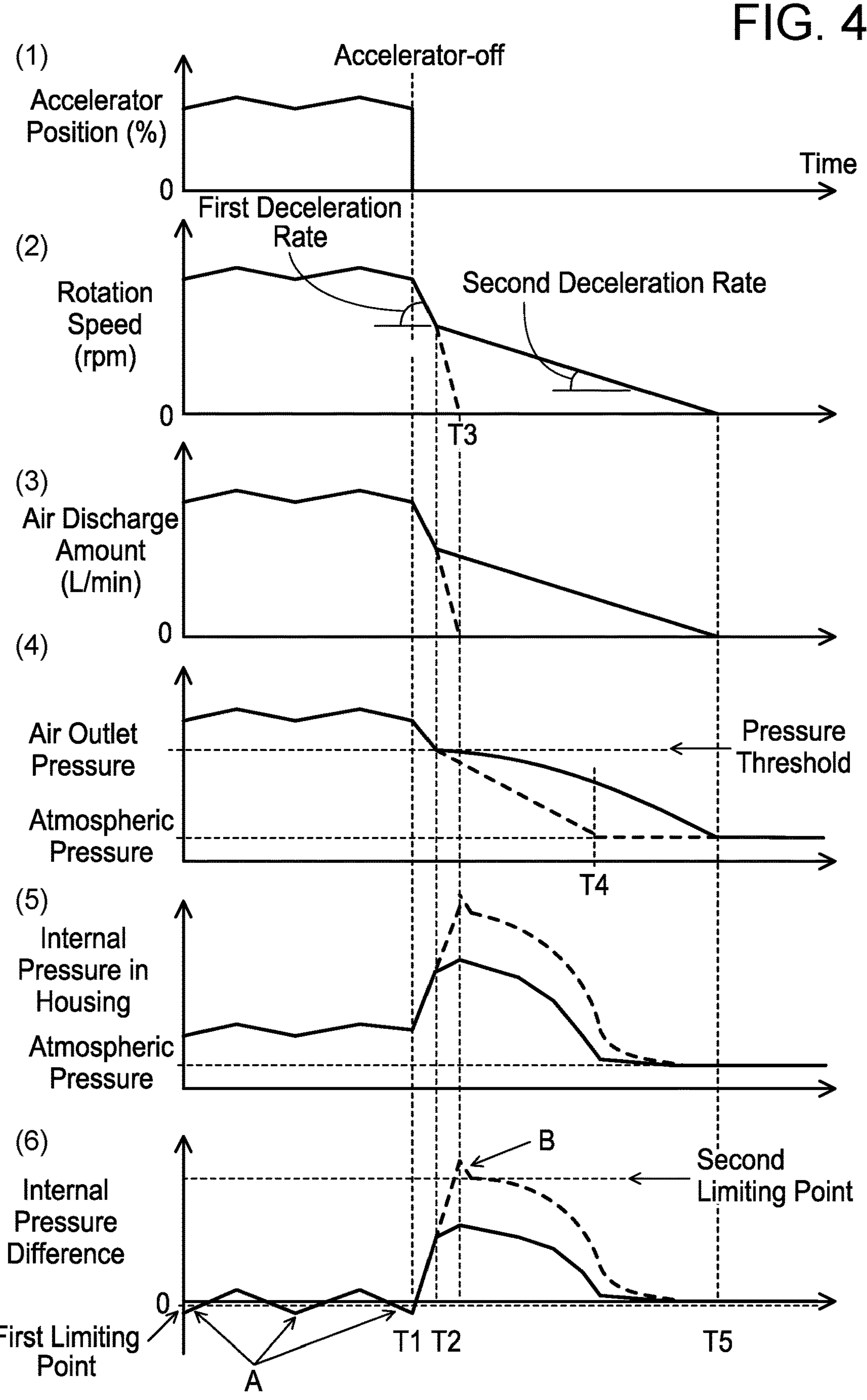
FIG. 4 is a time chart of a rotation speed, a flow rate and an air outlet pressure at the time of accelerator-off.

FIG. 4 shows an example of the change in rotation speed, flow rate and air outlet pressure of the compressor 100 at the time of the accelerator-off. FIG. 4 also shows the internal pressure of the motor housing 130 and the internal pressure difference (the internal pressure difference between the compression chamber 134 and the motor housing 130). Solid lines in FIG. 4 show the results of the control based on the flowchart in FIG. 3. Dashed lines in FIG. 4 show the results (comparative examples) when the rotation speed is decreased constantly at the first deceleration rate at the time of the accelerator-off.

FIG. 4(1) shows the change in the accelerator position. FIG. 4(2) shows the change in the rotation speed of the motor 110 (i.e., the rotation speed of the impeller 120). FIG. 4(3) shows the change in the amount of the compressed air (discharge amount) discharged by the compressor 100. FIG.

4(4) shows the change in the air outlet pressure of the compressor 100. FIG. 4(5) shows the internal pressure of the motor housing 130.

FIG. 4(6) shows the internal pressure difference. In FIG. 4(6), in the region above zero, the internal pressure of the compression chamber 134 is lower than the internal pressure of the motor housing 130. In the region below zero, the internal pressure of the compression chamber 134 is higher than the internal pressure of the motor housing 130. A first limiting point exists below zero. When the internal pressure difference is lower than the first limiting point (points where arrows A in FIG. 4(6) indicate), the air may leak from the compression chamber 134 into the motor housing 130. A second limiting point exists above zero. When the internal pressure difference is higher than the second limiting point (a point where an arrow B in FIG. 4(6) indicates), the air may leak from the motor housing 130 into the compression chamber 134.

The air leaks from the compression chamber 134 to the motor housing 130 even during the normal operation. Since the leaked air is discharged out through the breather pipe 160, the internal pressure difference tends not to increase during the normal operation.

At the time of the accelerator-off, the internal pressure difference increases because the internal pressure of the motor housing 130 increases rapidly, and the internal pressure difference may exceed the sealing capacity of the mechanical seal 140. In other words, the internal pressure difference exceeds the second limiting point. When the internal pressure difference reaches the second limiting point, the mixture of the air and the lubrication oil leaks into the compression chamber 134. By decreasing the rotation speed of the motor 110 of the compressor 100 gradually (i.e., by decreasing the rotation speed at the second deceleration rate), the internal pressure difference can be prevented from reaching the second limiting point.

It should be noted that the graph in FIG. 4 is a schematic representation of the change in the internal pressure difference between the compression chamber 134 and the motor housing 130, and is not an experimental result.

In the example in FIG. 4, the controller 40 detects the accelerator-off at time T1. Until time T1, the controller 40 controls the rotation speed of the motor 110 of the compressor 100 according to the change in the accelerator position. When the change in the accelerator position is gradual, the rotation speed of the motor 110 also gradually changes, and the change in the internal pressure difference between the compression chamber 134 and the motor housing 130 is also gradual. In other words, before time T1, the graph in FIG. 4(6) is maintained near zero.

After time T1 at which the accelerator-off is detected, the controller 40 decreases the rotation speed of the motor 110 at the first deceleration rate. As the rotation speed decreases, the discharge amount of air (FIG. 4(3)) and the air outlet pressure (FIG. 4(4)) also decrease. As the rotation speed decreases, the rotation of the oil pump 150 also decreases and the internal pressure of the motor housing 130 decreases.

At time T2, the air outlet pressure decreases to the pressure threshold. In the comparative example, the controller 40 continues to decrease the rotation speed of the motor 110 at the first deceleration rate even after the air outlet pressure decreases below the pressure threshold. When the controller 40 continues to decrease the rotation speed of the motor 110 at the first deceleration rate, the rotation speed reaches zero at time T3 (the graph of dashed line in FIG. 4(2)). The air discharge amount reaches zero at time T3 (the graph of dashed line in FIG. 4(3)). On the other hand, as mentioned earlier, the air outlet pressure decreases to the atmospheric pressure at time T4 because of large pressure loss in the flow path from the compression chamber 134 to the FC stack 10 (the pressure regulator valve 35).

The controller 40 in the embodiment decreases the rotation speed of the motor 110 at the second deceleration rate when the air outlet pressure decreases to the pressure threshold. The solid line graph in FIG. 4 shows the change in this occasion. After time T2, the rotation speed decreases gradually and the air discharge amount also decreases gradually. Since compression of the air continues in the compression chamber 134 after time T2, the air outlet pressure decreases more gradually.

When the accelerator is pressed again after the accelerator-off and before the rotation speed of the motor 110 reaches zero, the internal pressure of the motor housing 130 increases because the rotation speed of the motor 110 increases. Therefore, in this case as well, the compressor 100 in the embodiment is also expected to have the effect of suppressing the increase in the internal pressure difference.

Notes on the technique described in the embodiment will be described. The air outlet pressure may be measured in a unit system of pascals [Pa] or as a ratio with respect to the atmospheric pressure.

The outlet of the compressor 100 is connected to the air pipes 31, 32 and the FC stack 10, and the air pipe 32 includes the pressure regulator valve 35. Pressure loss in the flow path beyond the outlet of the compressor 100 may vary depending on an opening of the pressure regulator valve 35. Therefore, the air outlet pressure may change even when the rotation speed of the motor 110 is constant. The pressure threshold may be set to change depending on the rotation speed of the motor 110.

The compressor 100 of the embodiment includes the motor housing 130 in which the motor 110 is housed and the compression chamber 134 in which the impeller 120 is housed and the air is compressed by the rotation of the impeller 120. The compression chamber 134 and the motor housing 130 are in communication with each other, and the shaft 111 passes through the communication point. The space between the shaft 111 and a through hole of either of the compression chamber 134 or the motor housing 130 is sealed by a sealing component (the mechanical seal 140). The compressor 100 may be any type of a turbo, centrifugal, or scroll compressor. In the case of the scroll compressor, the impeller 120 in the embodiment corresponds to a scroll member.

The compressor 100 includes the oil pump 150 that operates in synchronization with the motor 110. As the output of the oil pump 150 increases (as the rotation speed increases), the internal pressure of the motor housing 130 increases.

The "traction motor" refers to an electric motor configured to operate by the output electric power of the fuel cell stack 10, and means an electric motor for driving the wheels.

The controller 40 decreases the rotation speed of the motor 110 at the first deceleration rate when the air outlet pressure of the compressor 100 is higher than the pressure threshold, while decreases the rotation speed at the second deceleration rate (<the first deceleration rate) when the air outlet pressure is lower than the pressure threshold. There is a certain relationship between the air outlet pressure and the rotation speed. Therefore, "when the air outlet pressure is higher than the pressure threshold" is equivalent to an expression "when the rotation speed of the motor 110 is higher than a predetermined rotation speed threshold". Similarly, "when the air outlet pressure is lower than the pressure threshold" is equivalent to an expression "when the rotation speed of the motor 110 is lower than a predetermined rotation speed threshold".

What is claimed is:

1. A fuel cell vehicle comprising:

a fuel cell stack configured to generate electric power for a traction motor;

a compressor configured to supply air to the fuel cell stack, the compressor including an impeller and a motor configured to rotate the impeller; and a controller configured to decrease a rotation speed of the motor when detecting accelerator-off;

wherein the controller is configured to decrease the rotation speed at a first deceleration rate when an air outlet pressure of the compressor is higher than a pressure threshold, and decrease the rotation speed at a second deceleration rate when the air outlet pressure of the compressor is lower than the pressure threshold, the second deceleration rate being lower than the first deceleration rate.

2. The fuel cell vehicle of claim 1, wherein the controller is configured to decrease the rotation speed at the second deceleration rate when the air outlet pressure of the compressor is lower than the pressure threshold in a state where a temperature of lubrication oil in the compressor is lower than a predetermined temperature threshold, and decrease the rotation speed at the first deceleration rate even when the air outlet pressure of the compressor is lower than the pressure threshold in a state where the temperature of the lubrication oil in the compressor is higher than the predetermined temperature threshold.

3. The fuel cell vehicle of claim 1, wherein the pressure threshold depends on the rotation speed of the motor when the accelerator-off is detected.

4. The fuel cell vehicle of claim 1, wherein the first deceleration rate is set to a maximum deceleration rate.

* * * * *